United States Patent Office 3,600,304
Patented Aug. 17, 1971

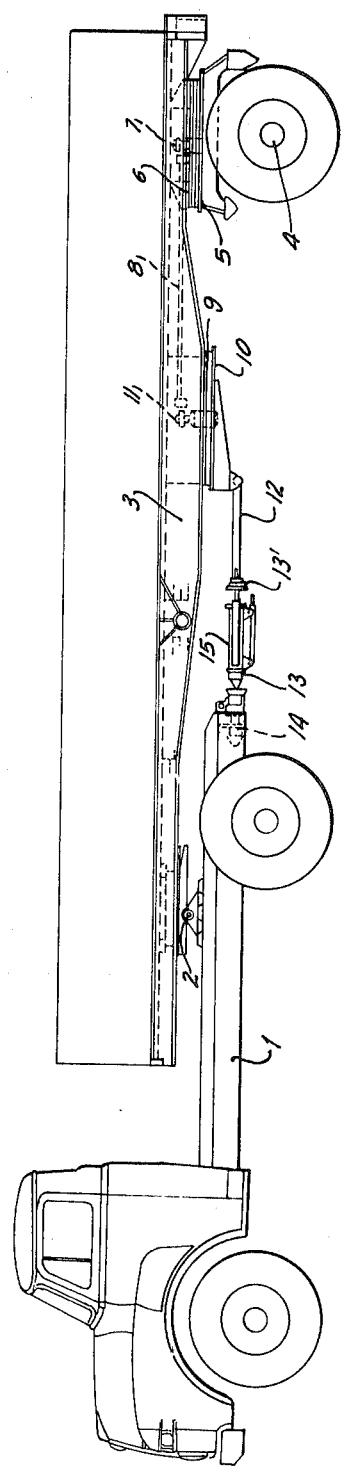

3,600,304
TRACTOR-TRAILER RIG
Willi Hildebrandt, 7 Waldweg, 424 Emmerich-Huthum, Germany, and Aloysius Theodorus van Huet, Schoolstraat 9, Pannerden, Netherlands
Filed June 16, 1969, Ser. No. 833,817
Claims priority, application Germany, June 14, 1968,
P 17 55 736.7
Int. Cl. B26d 53/00
U.S. Cl. 280—426
8 Claims

ABSTRACT OF THE DISCLOSURE

A tractor-trailer comprises a tractor and a trailer whose rear end is provided with an axle turnable about a vertical axis, and whose front end is arranged to rest on and be turnably secured to the rear end of the trailer. A turning arrangement is provided intermediate the front and rear ends of the trailer secured thereto turnable about an additional vertical axis parallel to the first-mentioned one, and a linkage arrangement links the turning arrangement to the axle of the trailer for turning movement in unison therewith. Limiting means connects the turning arrangement with the tractor so that the turning movement of the axle about its vertical axis, and thereby the angle which can be included between the tractor and the trailer when one of them moves laterally with respect to the other—as in turning a corner—is limited to a predetermined extent.

BACKGROUND OF THE INVENTION

The present invention relates to tractor-trailer constructions, and more particularly to the type of tractor-trailer construction wherein the trailer has an axle at its rear end whereas its front end rests on the tractor.

This type of tractor-trailer construction is already known and generally designated a semi-trailer. In theory, the trailer always strictly follows the track of the tractor, but in known constructions it does not properly do so when the tractor moves in a curve, for instance around a corner or the like. For this purpose the existing constructions are not satisfactory, quite aside from the fact that they are usable only with a specific trailer, that is with a trailer having a specific length.

SUMMARY OF THE INVENTION

It is, accordingly, an object of the present invention to provide a tractor-trailer or semi-trailer arrangement which avoids these disadvantages.

More particularly, it is an object of the invention to to provide such a semi-trailer arrangement wherein the wheels of the trailer are reliably compelled to follow the track of the wheels of the tractor.

A further object of the invention is to provide such an arrangement wherein this purpose can be accomplished regardless of the length of the trailer itself.

In pursuance of the above objects, and others which will become apparent hereafter, one feature of my invention resides in the provision of a tractor-trailer or semi-trailer which includes a tractor having a rear end and a longitudinal axis, and a trailer having a rear end provided with an axle and wheels, a front end which is arranged to be supported on the rear end of the tractor, and another longitudinal axis. First coupling means couples the front end of the trailer to the rear end of the tractor for turning movement about a first vertical axis passing through both. Second coupling means is provided on the rear end of the trailer. A ball gear is mounted on the rear end of the trailer for turning movement about a second vertical axis parallelling the first vertical axis, and the axle is mounted on the ball gear for turning movement therewith. Turnable means, such as a second ball gear, is mounted on the trailer spaced forwardly from the first ball gear in direction towards the front end of the trailer, and is turnable about a third vertical axis parallelling the first and second vertical axes. Linkage means links the turnable means with the second coupling means and with the ball gear, respectively, for transmitting turning movements between the turnable means and the ball gear. Finally, limiting means is associated with the linkage means intermediate the second coupling means and the turnable means and serves for limiting the extent of turning movement of the axle of the trailer about the aforementioned second vertical axis and for thereby limiting the maximum angle which can be included between the third longitudinal axes of the tractor and of the trailer in response to relative turning movement of the tractor and the trailer about the first aforementioned vertical axis.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single figure is a diagrammatic side-view of a tractor-trailer embodying the invention.

DESCRIPTION OF THE PREFERRED EMBODIMENTS

Reference numeral 1 designates the tractor which is well known to those skilled in the art, being of entirely conventional construction. Its rear end is provided in conventional manner with a so-called saddle coupling, and the front end of the semi-trailer 3 rests on the rear end of the tractor and is connected in known manner with the saddle coupling 2, so that the front end of the semi-trailer 3 and the tractor 1 can turn relative to one another about a vertical axis extending through the saddle coupling 2.

The rear end of the semi-trailer 3 is provided with an axle 4 having wheels in conventional manner. The axle 4 is connected to the rear ed of the semi-trailer 3 via a turning arrangement, which is a ball gear of which one annular section is connected to the trailer 3 whereas the other or lower annular section 5—which is associated in known manner of the upper annular section 6—is connected with the axle 4 which latter is elastically suspended therefrom. Furthermore, the annular section 5 carries a ball joint 7.

Further turning means, here again illustrated as a ball gear consisting of two annular sections 9 and 10, is provided on the semi-trailer 3 forwardly of the axle 4 in direction towards the front end of the semi-trailer. The one annular section 9 thereof is secured to the semi-trailer and the other annular section 10 is turnably secured to the annular section 9 for turning movement about a vertical axis in known manner. Ball joints 11 are provided on the annular section 10 and a linkage-rod arrangement is connected with the ball joints 7 and 11.

A steering fork 12 of known construction is also connected to the annular section 10 and has a free end extending in forward direction and connected to a rod 13 which is slidably mounted in a sleeve 15 whose front end is releasably secured to a conventional coupling 14 provided at the rear end of the tractor. The rod 13 in conjunction with the sleeve 15 constitutes limiting means and serves to provide length-compensation for such occasions when the tractor and the trailer turn with respect to one another about the axis extending through the saddle coupling 2, that is when the rig consisting of the tractor 1 and the trailer 3 negotiates curves or corners. No tension is transmitted by the steering fork 12 which serves only for guiding the axle 4 and for limiting the angle of inclination which can be included between the longitudinal axes of the tractor 1 and the trailer 3 when the rig negotiates the corner or curve. This limitation is effected by limiting the extent which the rod 13 can be shifted relative to the sleeve, for instance via an abutment plate 13' which is connected to the free end of the rod 13 and abuts against the rear end of the sleeve 15.

The ball gear consisting of the sections 9 and 10 is secured to the frame of the trailer 3 at a location rearwardly spaced from the front end thereof by a distance which is predetermined in accordance with the extent of angular inclination which is to be permitted between the longitudinal axis of the tractor 1 and the trailer 3. More specifically, the distance between the location for the ball gear consisting of the sections 9 and 10 and the coupling 14 is determinative of the angle which can be thus obtained. The farther the ball gear 9, 10 is rearwardly spaced from the coupling 14, the smaller will be the possible angle, and vice versa.

The linkage or tie-rod arrangement 8 may be a parallel-linkage arrangement which serves to transmit turning movement of the section 10 to the section 5. Because it cannot change in its length, it is subject only to tensile stresses.

The transmission of turning motion between the annular sections 10 and 5, that is the turning of the two in unison, assures that the angle through which the axle 4 may be turned, that is the angle which can be included in the longitudinal axis of the tractor 1 and the trailer 3, is independent of the length of the trailer 3. It is thus possible to obtain an angle of approximately 20° or more without having any parts extend laterally beyond the contour of the rig. The only modification which is necessary in this construction to make it usable with trailers of different lengths is to use a longer or shorter parallel-linkage arrangement 8 without requiring any changes in the remainder of the construction.

The provision of the steering fork 12 directly effects the turning movement of the axle 4 of the trailer 3 in opposition to the movement of the tractor 1 when the rig negotiates curves or corners, without requiring the conventional motion-transmitting arrangements.

Because of the length compensation provided in accordance with the invention, the dangerous "folding" of the arrangement or rig which occurs on negotiating of corners or curves, is avoided. The term dangerous is used advisedly because this could result in overturning of the rig if unchecked. However, because of the length compensation provided by the limiting arrangement according to the present invention, this is avoided. Therefore, the rig can be driven even backwards without any auxiliary aids.

It will be understood that each of the elements described above, or two or more together, may also find a useful application in other types of constructions differing from the types described above.

While the invention has been illustrated and described as embodied in a tractor-trailer rig, it is not intended to be limited to the details shown, since various modifications and structural changes may be made without departing in any way from the spirit of the present invention.

What is claimed as new and desired to be protected by Letters Patent is set forth in the appended claims:

1. A tractor-trailer, comprising a tractor having a rear end and a longitudinal axis; a trailer having a rear end provided with an axle and wheels, a front end arranged to be supported on said rear end of said tractor, and another longitudinal axis; first coupling means coupling said front end of said trailer to said rear end of said tractor for turning movement about a first vertical axis passing through both; second coupling means provided on said rear end of said tractor; ball gear means mounted on said rear end of said trailer for turning movement about a second vertical axis parallel to said first axis, said axle being mounted on said ball gear means for turning movement therewith; turnable means mounted on said trailer spaced from said ball gear means in direction towards said front end, and being turnable about a third vertical axis parallelling said first and second axes; linkage means linking said turnable means only with said second coupling means and said ball gear means, respectively, for transmitting turning movements between said turnable means and said ball gear means; and limiting means associated with said linkage means and said turnable means, and being operative for limiting the extent of turning movement of said axle about said second axis and for thereby limiting the maximum angle which can be included between said longitudinal axes in response to relative turning movement of said tractor and trailer about said first axis.

2. A tractor-trailer as defined in claim 1, wherein said limiting means comprises relative movable abutment portions arranged to abut one another in response to predetermined turning movement of said tractor and trailer relative to one another about said first axis.

3. A tractor-trailer as defined in claim 2, wherein said turnable means comprises additional ball gear means.

4. A tractor-trailer as defined in claim 2; and further comprising releasable mounting means mounting said turnable means on said trailer for positioning in a plurality of locations in which it is respectively closer to and farther from said front end, said maximum angle decreasing with increasing spacing of said turnable means from said front end.

5. A tractor-trailer as defined in claim 2, said linkage means comprising a linkage member having one end portion connected to said turnable means and a rod-like other end portion extending from said one end portion towards said front end of said trailer; and said limiting means comprising an elongated sleeve mounted on said trailer extending longitudinally thereof and having open ends, a rod slidably received in said sleeve through the open ends thereof and having one end portion connected to said other end portion of said linkage member and another end portion releasably connected to said second coupling means, said rod being withdrawable from said sleeve in direction toward said axle to a predetermined maximum extent, and cooperating abutment portions on said sleeve and said free end portion of said rod for limiting the extent to which the latter can be withdrawn from said sleeve.

6. A tractor-trailer as defined in claim 2; said linkage means comprising a parallel-rod linkage connecting said ball gear means and said turnable means so that the same turn in unison about said second and third axes, respectively.

7. A tractor-trailer as defined in claim 6, wherein said parallel-rod linkage is accommodated within the lateral outlines of said trailer.

8. A tractor-trailer as defined in claim 5; said linkage means comprising a parallel-rod linkage connecting said ball gear means and said turnable means so that the same turn in unison about said second and third axes, respectively.

References Cited

UNITED STATES PATENTS

| 2,223,436 | 12/1940 | Winn | 280—426 |
| 2,793,052 | 5/1957 | Googe | 280—426 |
| 3,048,423 | 8/1962 | Carmody | 280—426 |

FOREIGN PATENTS

| 430,886 | 2/1948 | Italy. | |

LEO FRIAGLIA, Primary Examiner